United States Patent
Burr (10) Patent No.: US 8,321,587 B2
(45) Date of Patent: *Nov. 27, 2012

(54) METHOD FOR DISCOVERY AND ROUTING USING A PRIORI KNOWLEDGE IN THE FORM OF APPLICATION PROGRAMME WITHIN MOBILE AD-HOC NETWORKS

(75) Inventor: Jeremy Burr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 368 days.

This patent is subject to a terminal disclaimer.

(21) Appl. No.: 12/709,987

(22) Filed: Feb. 22, 2010

(65) Prior Publication Data

US 2010/0153562 A1    Jun. 17, 2010

Related U.S. Application Data

(63) Continuation of application No. 10/035,463, filed on Oct. 18, 2001, now Pat. No. 7,668,958.

(51) Int. Cl.
*G06F 15/173*    (2006.01)

(52) U.S. Cl. .......... 709/238; 709/224; 709/227
(58) Field of Classification Search .......... 709/224, 709/225, 238, 242
See application file for complete search history.

(56) References Cited

U.S. PATENT DOCUMENTS

| | | | | |
|---|---|---|---|---|
| 5,618,045 | A | * | 4/1997 | Kagan et al. .......... 463/40 |
| 5,987,011 | A | * | 11/1999 | Toh .......... 370/331 |
| 6,977,938 | B2 | * | 12/2005 | Alriksson et al. .......... 370/401 |
| 6,990,075 | B2 | * | 1/2006 | Krishnamurthy et al. ..... 370/236 |
| 7,006,453 | B1 | * | 2/2006 | Ahmed et al. .......... 370/255 |
| 7,516,201 | B2 | * | 4/2009 | Kovacs et al. .......... 709/223 |
| 7,668,958 | B2 | * | 2/2010 | Burr .......... 370/238 |
| 2002/0058502 | A1 | * | 5/2002 | Stanforth .......... 455/422 |
| 2003/0060202 | A1 | * | 3/2003 | Roberts .......... 455/445 |

* cited by examiner

*Primary Examiner* — Philip B Tran
(74) *Attorney, Agent, or Firm* — Cool Patent, P.C.; Kenneth J. Cool (57) ABSTRACT

A mobile ad-hoc network device includes application software. The device constructs its routing table, listing reachable devices with the same application software. The routing table knowledge is dynamic, as devices enter and leave the network or their parameters change.

10 Claims, 12 Drawing Sheets

METHOD FOR DISCOVERY AND ROUTING USING A PRIORI KNOWLEDGE IN THE FORM OF APPLICATION PROGRAMME WITHIN MOBILE AD-HOC NETWORKS

RELATED APPLICATION DATA

This application is a continuation of prior application U.S. patent application Ser. No. 10/035,463, titled "METHOD FOR DISCOVERY AND ROUTING USING A PRIORI KNOWLEDGE IN THE FORM OF APPLICATION PROGRAMME WITHIN MOBILE AD-HOC NETWORKS", filed Oct. 18, 2001, now U.S. Pat. No. 7,668,958, which in turn is related to U.S. patent application Ser. No. 09/773,682, titled "ENABLING RESTRICTED COMMUNICATIONS BETWEEN A PLURALITY OF USERS", filed Jan. 31, 2001, now abandoned, and to U.S. patent application Ser. No. 09/930,779, titled "METHOD FOR DISCOVERY AND ROUTING USING BUDDY LISTS IN MOBILE AD-HOC NETWORKS", filed Aug. 15, 2001, now U.S. Pat. No. 8,060,013, and to U.S. patent application Ser. No. 09/948,300, titled "METHOD FOR RESTRICTED COMMUNICATIONS USING BUDDY LISTS IN MOBILE AD-HOC NETWORKS", filed Sep. 6, 2001, now U.S. Pat. No. 7,177,594, and to U.S. patent application Ser. No. 09/948,270, titled "METHOD FOR DISCOVERY AND ROUTING USING ATTRIBUTES IN MOBILE AD-HOC NETWORKS", filed Sep. 6, 2001, now abandoned, and to U.S. patent application Ser. No. 10/035,896, titled "METHOD FOR DISCOVERY AND ROUTING WITHIN MOBILE AD-HOC NETWORKS", filed Oct. 18, 2001, now U.S. Pat. No. 7,190,961.

FIELD OF THE INVENTION

This invention pertains to mobile ad-hoc networks, and more particularly to managing a sub-network of mobile ad-hoc network devices.

BACKGROUND OF THE INVENTION

The ability to communicate with others has always been an important function for people. First the telegraph, and then the telephone revolutionized communication, by making communication at a distance possible. The cellular telephone marked a further turning point in communication, as people were no longer tied to a phone with a fixed physical location. And the more recent Bluetooth standard (Specification of the Bluetooth System, Version 1.1, Feb. 22, 2001) and 802.11a standard (IEEE Standard 802.11a-1999, available on the Institute of Electrical and Electronics Engineers web site, http://standards.ieee.org/reading/ieee/std/lanman/802.11a-1999.pdf) describe how wireless communication may be achieved using mobile devices.

Where mobile devices attempt to intercommunicate, a mobile ad-hoc network (MANET) is set up. In contrast to the typically-envisioned computer network, a MANET does not consist of separate servers and clients. Instead, each mobile device acts as both client and server. That is, each mobile device is responsible for not only sending messages on its own, but also for routing messages. Further, each mobile device needs to be able to route messages sent by a different device, and bound for a different destination.

Figure 1A:
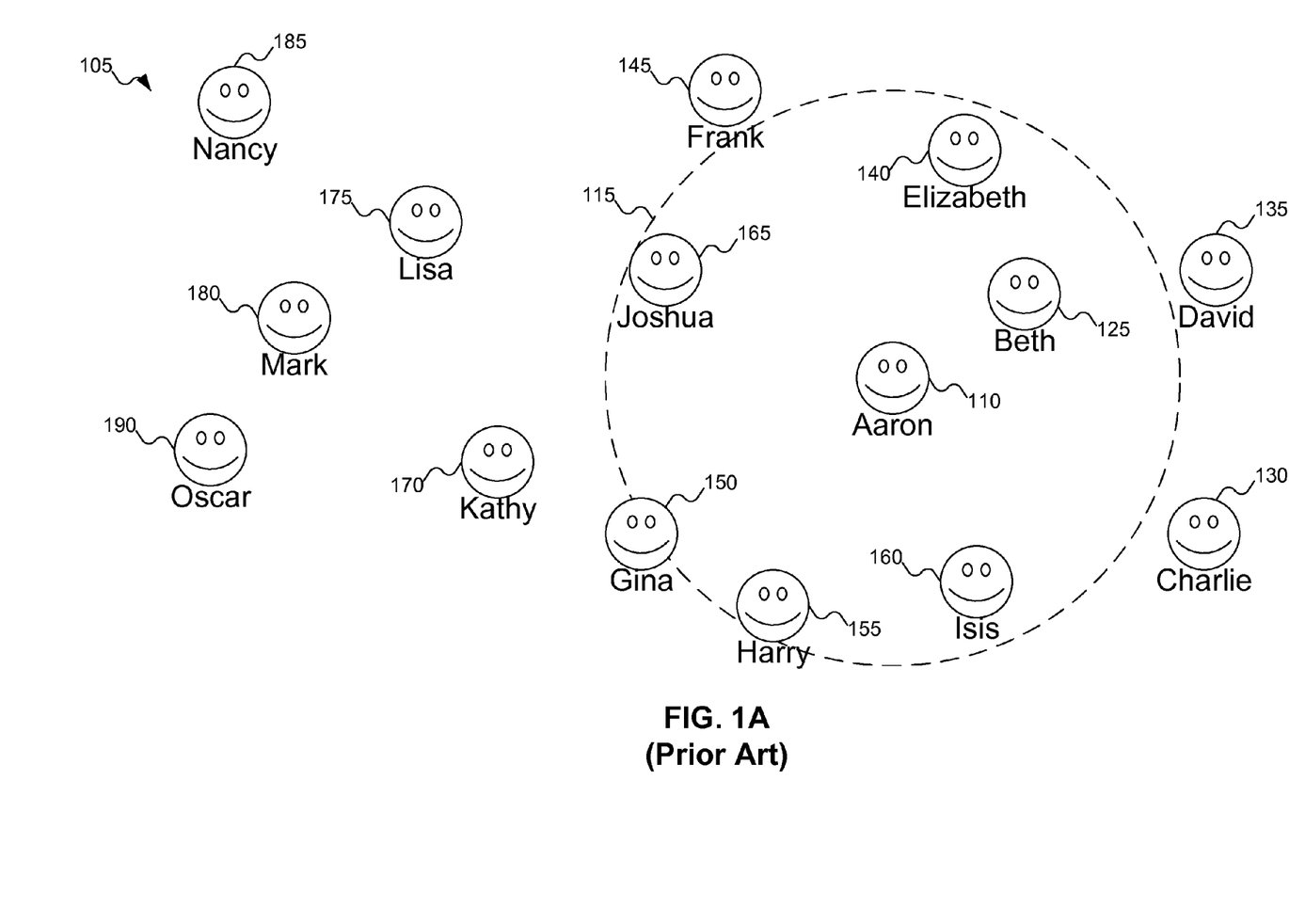
FIG. 1A shows a typical arrangement of mobile ad-hoc network devices.

FIG. 1A shows a scattering of mobile ad-hoc network devices 105. In FIG. 1A, a number of mobile devices are scattered around a location. The location may be a mall, sporting arena, city, or any other type of location, without any limit. In the discussion below, for simplicity of description each person using a mobile device will be described as able to communicate with other persons, although in truth it is the mobile devices that communicate with each other. For example, although the description below may talk about Aaron 110 communicating with Beth 125, it is really Aaron's device that communicates with Beth's device.

Each mobile device has a limited range: for example, Aaron's device 110 has a range 115 shown as a dashed circle. Thus, not every other mobile device has a direct line of communication with every other device. For example, Beth 125 is within direct communications range of Aaron 110, but Charlie 130 is not within direct communications range of Aaron 110.

Figure 1B:
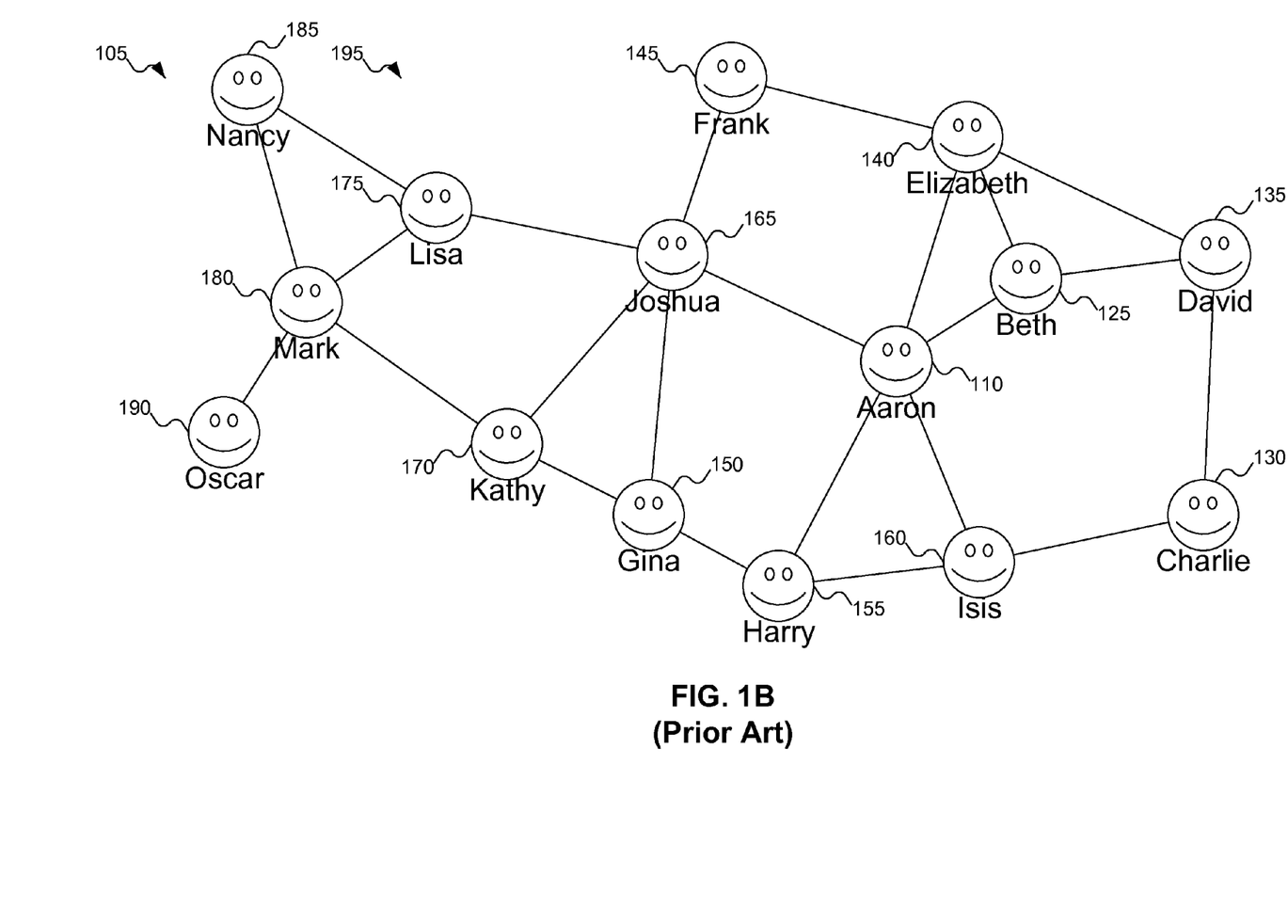
FIG. 1B shows a mobile ad-hoc network established among the mobile ad-hoc network devices of FIG. 1A.

The intuitive approach for managing a MANET is to have each device be aware of all other devices in the MANET. FIG. 1B shows a mobile ad-hoc network 195 established among the mobile ad-hoc network devices of FIG. 1A. As may be seen in FIG. 1B, Aaron 110 may communicate directly with Beth 125, Elizabeth 140, Harry 155, and Isis 160, but may not communicate directly with Charlie 130 or David 135. Nevertheless, Aaron 110 may communicate with Charlie 130 or David 135 through Beth 125 or Isis 160, respectively.

Even if a person is in the MANET, he may not be reachable. For example, consider Oscar 190. Even if Oscar's device is active within the network, given Oscar's location, Oscar 190 may communicate with other devices in the MANET only through Mark 180. If Mark 180 leaves the network (e.g., by turning off his device), Oscar 190 may neither send nor receive messages from anyone else in the MANET.

There are three problems with the intuitive approach to managing a MANET. The first problem is bandwidth. As devices enter, leave, and move around the MANET, the MANET is constantly changing. Requiring each device in the MANET to be aware of changes made by the entry, departure, or movement of a device would consume a great deal of the available bandwidth.

The second problem with the intuitive approach to managing a MANET is power. Mobile devices are, by definition, not tethered to a power source. That is, the power source is mobile with the device. Typically, this means battery power. Since battery power is limited and communicating within the network is power-intensive, having each device update itself as another device enters, leaves, or moves with the MANET may consume a large percentage of the available power.

The third problem with the intuitive approach to managing a MANET is complexity. As the number of devices in the MANET increases, the number of routes through the MANET increases exponentially. For even a relatively small number of devices (100 is typically considered a sizeable MANET), the time required to update a routing table for the MANET may take longer until another device enters, leaves, or moves within the MANET. In addition, the space requirements for storing the routing table may quickly exceed the available space in the mobile device.

The present invention addresses this and other problems associated with the prior art.

DETAILED DESCRIPTION

Figure 2:
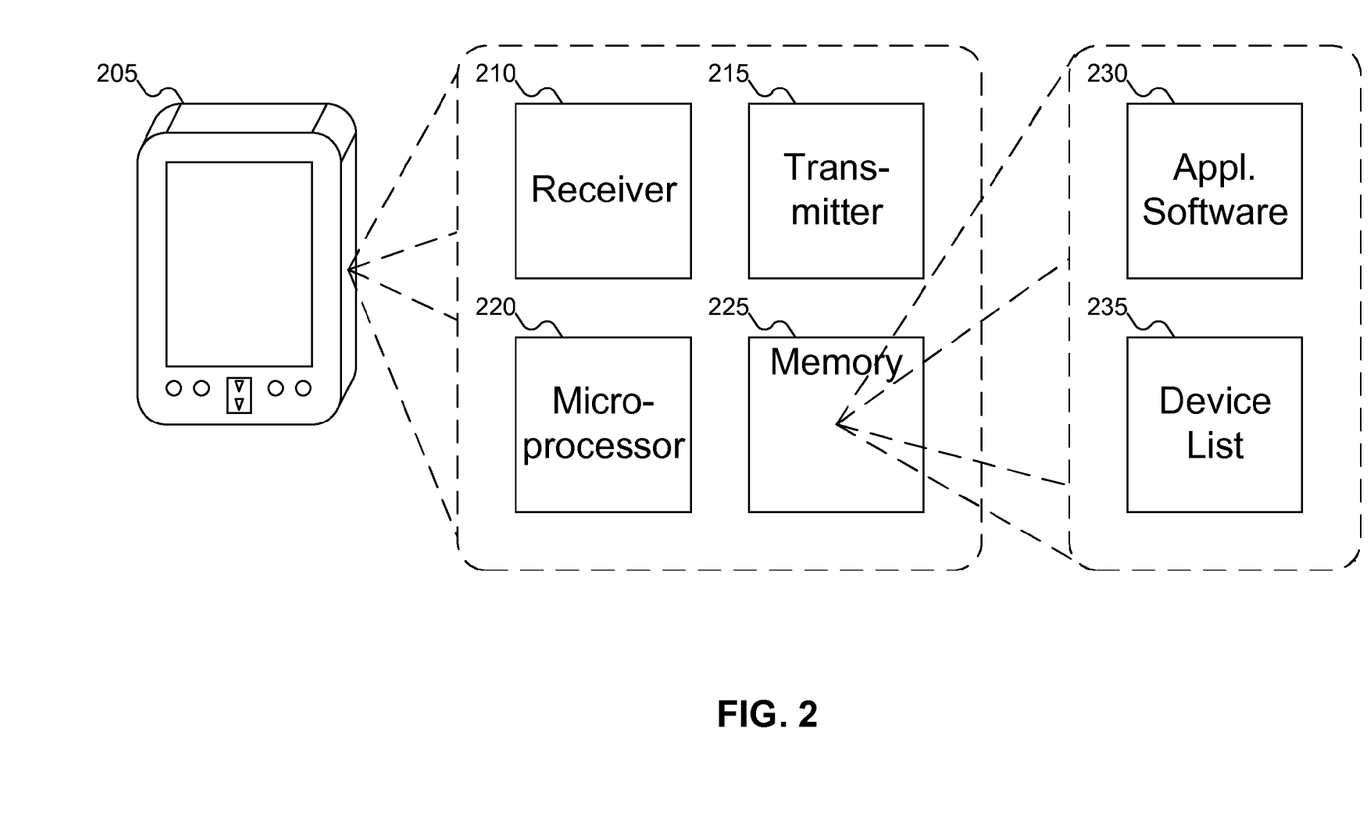
FIG. 2 shows a mobile device operable within the mobile ad-hoc network FIG. 1B, according to an embodiment of the invention.

FIG. 2 shows a mobile device operable within the mobile ad-hoc network (MANET) of FIG. 1B, according to an embodiment of the invention. In FIG. 2, mobile device 205 is used for communicating with other nearby mobile devices. Although shown as a personal digital assistant (PDA), a person skilled in the art will recognize that mobile device 205 may be any device capable of interacting with nearby devices, typically in a wireless manner. For example, mobile device 205 may be a cellular telephone or notebook computer properly equipped to interact with nearby devices. In fact, mobile device 205 need not be truly mobile: device 205 might be a fixed access point (such as a desktop computer or kiosk within the environment). But for purposes of the discussion below, device 205 will be considered to be mobile.

Mobile device 205 includes, among other components, receiver 210, transmitter 215, microprocessor 220, and memory 225. Receiver 210 is used to receive communications from other nearby mobile devices. Transmitter 215 is used to transmit communications to other nearby mobile devices. Although in a preferred embodiment receiver 210 and transmitter 215 are designed to operate wirelessly, a person skilled in the art will recognize that receiver 210 and transmitter 215 may also be wire-based. Microprocessor 220 is used to control the internal operations of mobile device 205. And memory 225 is used to store information of a temporary or semi-permanent nature within mobile device 205.

In mobile device 205, memory 225 includes two particular items. First, memory 225 stores application software 230. Application software 230 is some program, of any nature, that the user has chosen to install into mobile device 205. For example, application software 230 may be a word processing program used to draft and revise electronic documents, which the user has used to create a document that he wishes to share with colleagues. Or application software 230 may be a multi-player game, such as Doom®, which allow multiple people to play together in the same game. (Doom is a registered trademark of id Software, Inc.)

Memory 225 also stores device list 235. Device list 235 is a list of other devices with which mobile device 205 may communicate. Referring back to FIG. 1B, if mobile device 205 belongs to Aaron 110, then device list 235 might list the devices belonging to Beth 125, David 135, Joshua 165, and Lisa 175 as devices with which Aaron 110 may communicate.

Note two things about device list 235. First, note that not all devices may be listed. This may be explained in a number of ways. For example, the non-listed devices may be turned off, so that they may not communicate. Or, Aaron 110 may specifically indicate the non-listed devices as devices with which Aaron 110 does not wish to communicate. Or, the non-listed devices may be reachable but not shown to Aaron 110 because they are not part of a connected sub-network to which Aaron belongs.

Second, observe that not all the devices listed in device list 235 may directly communicate with Aaron 110. For example, Aaron 110 may communicate with Lisa 175, even though Lisa 175 is not within range of Aaron 110. To send a message to Lisa 175, Aaron 110 sends a message to Joshua 165, who then forwards the message to Lisa 175. Thus, part of device list 235 is an indication of the path to the intended recipient. Typically, only the first leg of the path is stored, as the intermediary recipients know how to communicate with the intended recipient on their own. But a person skilled in the art will recognize that device list 235 may store a required path to the intended recipient.

Among the various operations managed by microprocessor 220 is the management of device list 235. Specifically, as devices enter, leave, or move around the MANET, the possible recipients with which mobile device 205 may vary. (Movement within the MANET may be considered the same as a mobile device leaving the network at one point, and entering the network at another point. Because movement may be managed as a combined entry/exit for the mobile device, the remainder of the description below will only refer to the entry and/or exit of mobile devices from the MANET.) Microprocessor 220 is responsible for updating device list 235 as microprocessor 220 receives information about changes in the MANET.

In contrast to the general case using the intuitive approach to MANET management, in an embodiment of the invention mobile device 205 manages information about only a subset of the mobile devices. Specifically, in an embodiment of the invention, mobile device 205 only keeps track of devices it may reach, all of whom share common application software, such as application software 230. For example, if application software 230 is Doom, then microprocessor 220 only tracks which devices within the MANET include Doom, and are connected via other devices including the application software.

As devices enter the MANET, they must inform other devices nearby about which application software packages they include. Otherwise, it would be difficult for mobile device 205 to determine the structure of sub-networks, as discussed below.

Figure 3:
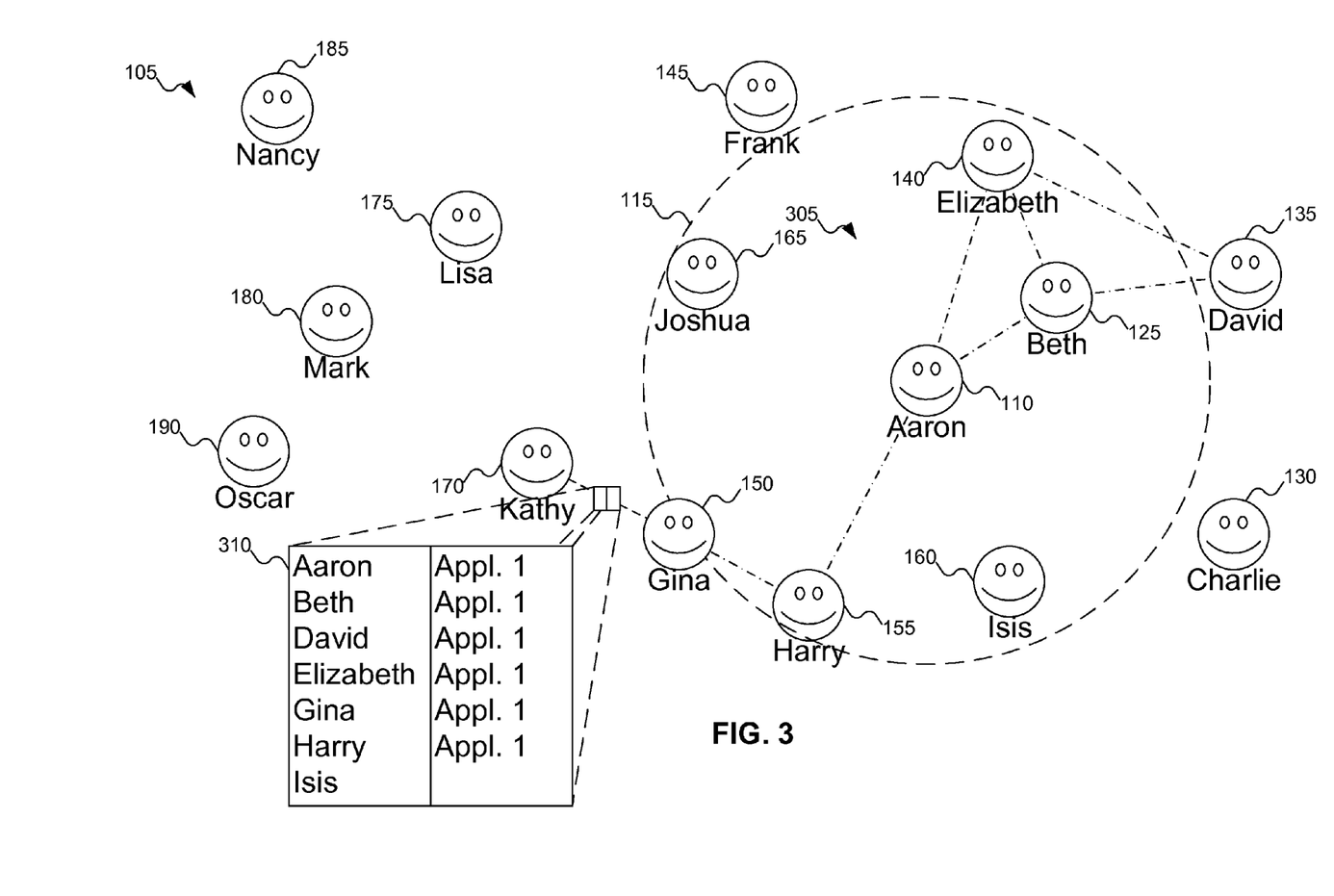
FIG. 3 shows a sub-network established among the mobile ad-hoc network devices of FIG. 1A, according to an embodiment of the invention.

FIG. 3 shows a sub-network established among the mobile ad-hoc network devices of FIG. 1A, according to an embodiment of the invention. In FIG. 3, Aaron 110, Beth 125, David 135, Elizabeth 140, Gina 150, and Harry 155 are all active within the MANET, and each of them includes the common application software. Thus, the subset of users 105 consisting of Aaron 110, Beth 125, David 135, Elizabeth 140, Gina 150, and Harry 155 form sub-network 305 of users all including the same application software.

Redrawn in FIG. 3 is range 115 of Aaron 110. Note that David 135 and Gina 150 are outside range 115 of Aaron 110, but are part of sub-network 305.

Assume for a moment that users Frank 145, Joshua 165, and Kathy 170 do not have application software in question installed on their mobile devices. Then the device list in, for example, Aaron's device does not have to worry about routing to any other recipient, other than those that are part of sub-network 305. This keeps the size of the routing table small and manageable, as opposed to the general solution to a MANET. Even if Mark 180 has the application software installed on his mobile device, there is no way to reach Mark 180, since he is not part of sub-network 305. So, the routing table managed by Aaron 110 does not even list Mark as a possible recipient. Mark may be a participant in a separate sub-network using the application software, but he is not part of sub-network 305.

Note that what is controlled here is not the number of links among users 105, but rather the number of users involved in sub-network 305. If every one of users 105 included the application software, then network 195 of FIG. 1B would show the complete network of persons with the application software. But in general, the percentage of nodes including common application software is relatively low, and the percentage of contiguous nodes including the common application software is even lower. By curtailing the growth of the number of users, the exponential growth in the management of the network is reigned in.

Now, consider what happens if Kathy 170 becomes active (i.e., assume that her device was turned off before, and now is turned on). When Kathy 170 broadcasts her presence to users 105, including any application software packages Kathy 170 has installed, so that she may join the appropriate sub-network(s), Gina 150 then checks to see if Kathy 170 has any common application software packages with Gina 150. Since Kathy 170 has the application software common to sub-network 305, Gina 150 forwards to Kathy 170 the participants in sub-network 305. This is shown in list 310. Kathy 170 updates her routing table to reflect that Aaron 110, Beth 125, David 135, Elizabeth 140, Gina 150, and Harry 155 are all reachable because of the common application software. Kathy also notes that to route messages to Aaron 110, Beth 125, David 135, Elizabeth 140, Gina 150, or Harry 155, Kathy 170 sends the communication first to Gina 150. Gina 150 updates her routing table to reflect Kathy's membership in sub-network 305. Finally, Gina 150 forwards information about Kathy to all users of sub-networks of which Gina 150 is a member (in this case, just Harry 155). Harry 155 then propagates along Kathy's admittance to sub-network 305, so that Kathy's presence is eventually known by all members of sub-network 305.

Figure 4:
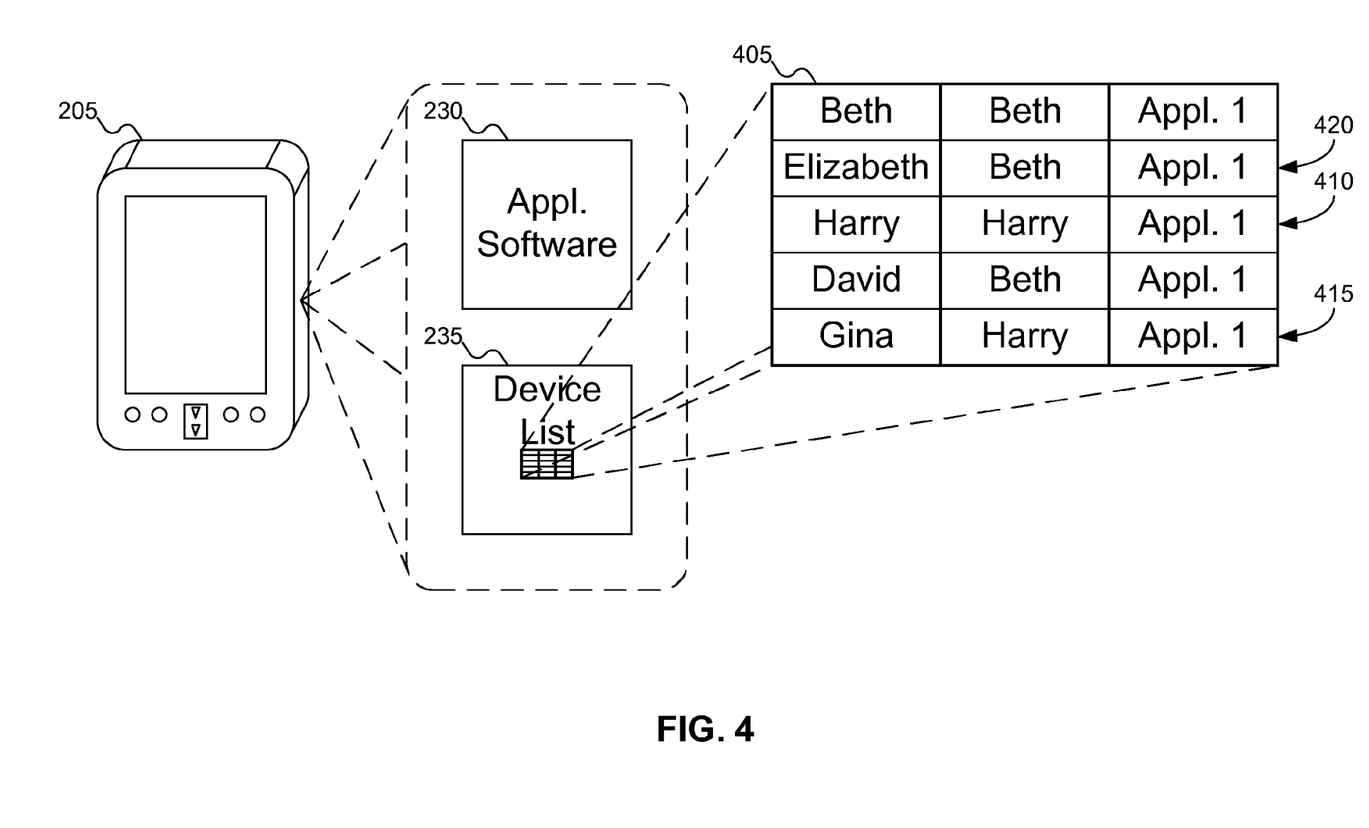
FIG. 4 shows the mobile device of FIG. 2 in the sub-network of FIG. 3 including a routing table, according to an embodiment of the invention.

FIG. 4 shows the mobile device of FIG. 2 in the sub-network of FIG. 3 including a routing table, according to an embodiment of the invention. In FIG. 4, mobile device 205 belongs to Aaron 110, but a person skilled in the art will recognize how the description below may be modified for any other user. Device list 235, stored in memory 225 (refer to FIG. 2) of mobile device 205, is represented as routing table 405. Routing table 405 lists each possible recipient for a communication from mobile device 205, the device to which the communication should be sent (i.e., the first hop along the routing path from mobile device 205 to the communication's destination), and the properties of that device. For example, routing table entry 410 specifies that to send a message to Harry, the message may be sent directly to Harry, since Aaron and Harry are directly connected. Routing table entry 415 specifies that to send a message to Gina, the message should first be directed to Harry, because the path to Gina goes through Harry.

Routing table entry 420 is more interesting. Routing table entry 420 specifies that to send a message to Elizabeth, the message should first be sent to Beth. But an examination of sub-network 305 (see FIG. 3) shows that Aaron and Elizabeth are directly connected. Why shouldn't the direct connection be used in this case? It may be that the cost of communicating to Elizabeth through Beth is cheaper than the cost of communicating directly with Elizabeth. Recall that mobile device 205 may be any type of mobile device capable of interacting with the network. Elizabeth may have a very low-bandwidth connection to Aaron directly, but Beth may have a high-bandwidth connection to both Aaron and Elizabeth. Or, the cost of the communications channel between Aaron and Elizabeth may be much more expensive than the cumulative costs of the communications channels between Aaron and Beth and Beth and Elizabeth. Thus, it may be "cheaper" (in some sense of the word) for Aaron to route communications to Elizabeth through Beth rather than communicating directly with Elizabeth. The specifics of how a "cheapest" path is determined between two users in a MANET or sub-network is beyond the scope of this document, but any technique for determining a least-cost path may be used.

As should be apparent, routing table 405 is dynamic. That is, as devices enter and leave the sub-network, routing table 405 changes. For example, if Kathy joins the sub-network, then routing table 405 adds an entry reflecting the "cheapest" path to route a message to Kathy.

Routing table 405 is also dynamic, in that the "cheapest" path may change. For example, as discussed above, routing table entry 420 specifies that messages for Elizabeth be sent to Beth. But consider what might happen if Beth is involved in more than one sub-network, and suddenly all of Beth's processing is devoted to traffic on the other sub-network. Since Beth is unable to handle any traffic on the sub-network, using Beth as a route from Aaron to Elizabeth becomes more expensive than just routing directly from Aaron to Elizabeth. In this case, routing table entry 420 would be updated to reflect the change in cost for routing within the sub-network. A person skilled in the art will recognize other ways the cost of routing can change.

Figure 5:
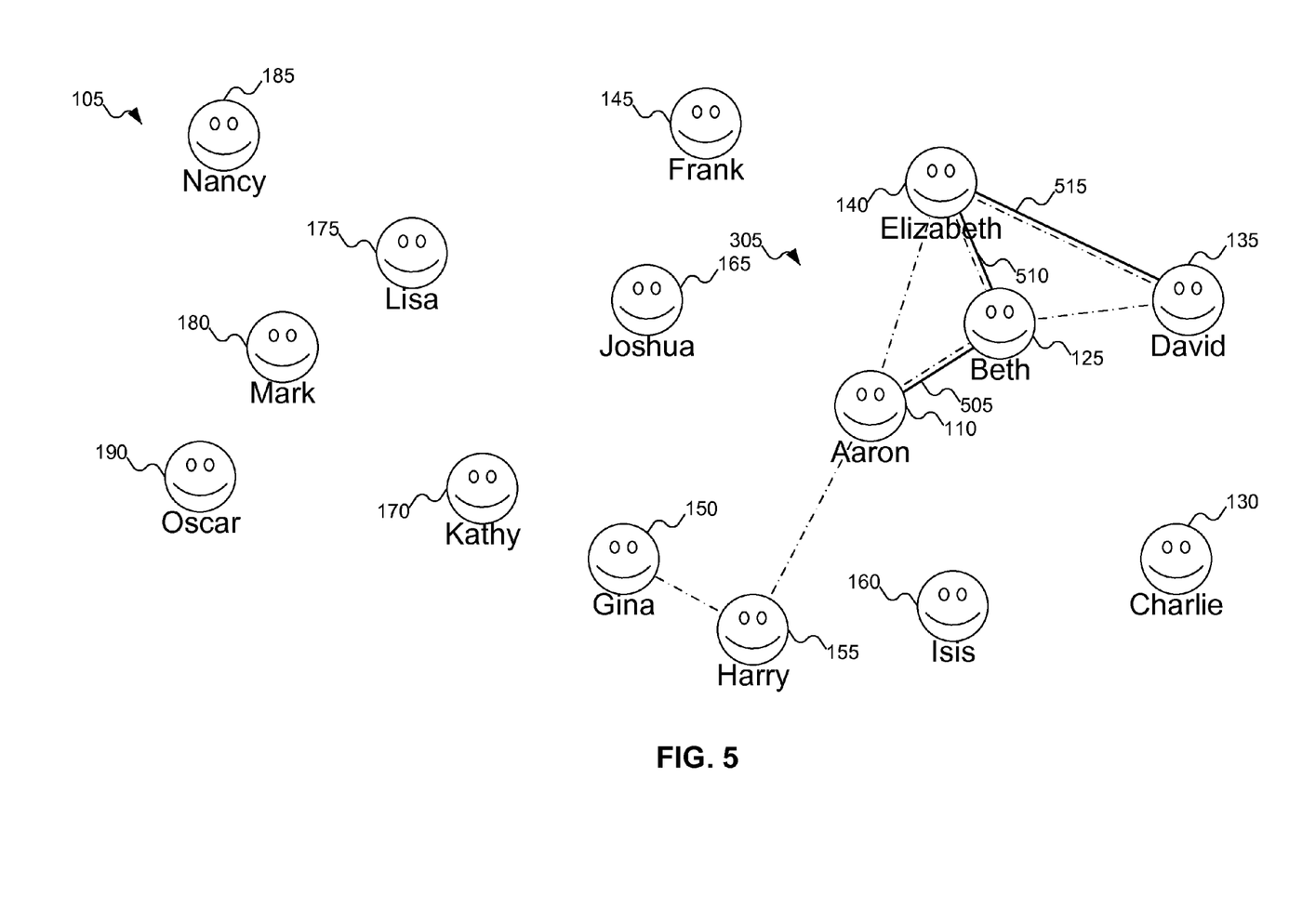
FIG. 5 shows a path through the sub-network of FIG. 3 used for communicating between two mobile devices in the sub-network.

FIG. 5 shows a path through the sub-network of FIG. 3 used for communicating between two mobile devices in the sub-network. In FIG. 5, Aaron 110 is sending a message to David 135. Aaron begins by checking his routing table (see FIG. 4). According to Aaron's routing table, a message destined for David 135 is to be sent first to Beth 125. Thus, Aaron 110 sends the message to Beth 125 as shown by line 505, and forgets about the message. Unless Aaron 110 hears back that David could not receive the message (either David is off-line or no longer connected to sub-network 305), Aaron 110 may assume that the message has been or ultimately will be delivered to its recipient.

Beth 125, seeing a message destined for David 135, checks her routing table. According to Beth's routing table, messages destined for David 135 are routed to Elizabeth 140. Once Beth 135 has delivered the message, as shown by line 510, Beth 135 forgets about the message, unless she needs to relay a "delivery failure" message back to Aaron. Elizabeth 140 now checks her routing table, and sees that messages destined for David 135 may be delivered directly to David 135. So Elizabeth 140 sends the message to David 135, as shown by line 515, and the message is received by its intended recipient.

Figure 6:
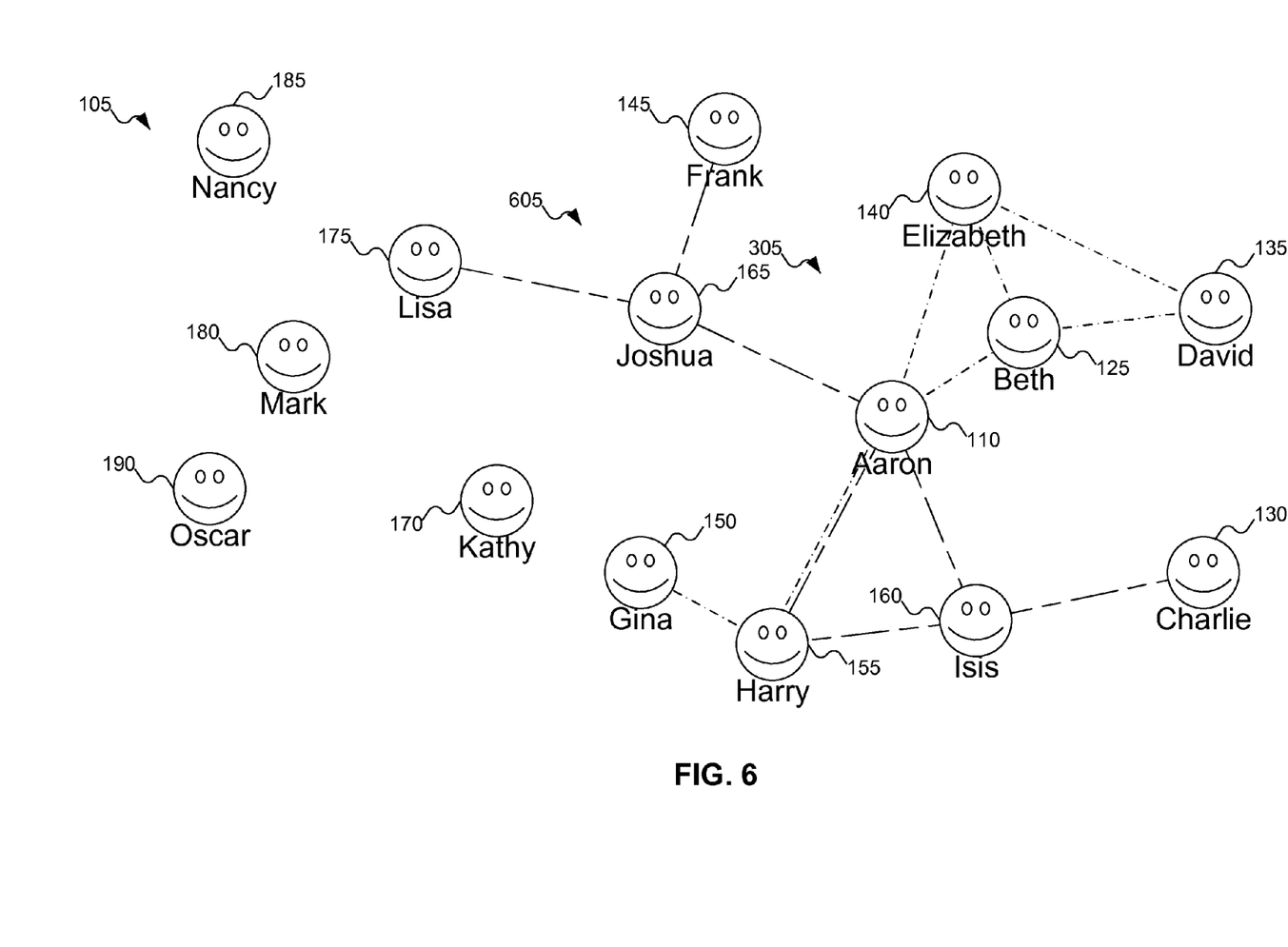
FIG. 6 shows two sub-networks established among the mobile ad-hoc network devices of FIG. 1A, according to an embodiment of the invention.

FIG. 6 shows two sub-networks established among the mobile ad-hoc network devices of FIG. 1A, according to an embodiment of the invention. In FIG. 6, as opposed to FIG. 3, there are two sub-networks operating at the same time. For example, sub-network 305 may be a game of Doom being played by the sub-network members, whereas sub-network 605 may be a sub-network of colleagues working cooperatively on a project using some application software. Note that Aaron 110 and Harry 155 are members of both sub-network 305 and sub-network 605.

In a preferred embodiment of the invention, communications may not cross sub-networks. For example, Elizabeth 140 and Frank 145 may not communicate, even though they are within range of each other. This is because they are members of different sub-networks: Elizabeth 140 is a member of sub-network 305, and Frank is a member of sub-network 605. Even though the sub-networks 305 and 605 overlap, that is, Aaron 110 is a member of both sub-networks, Elizabeth 140 and Frank 145 may not see each other, and therefore may not communicate with each other, even through Aaron 110. A person skilled in the art will recognize how the embodiment of the invention may be modified to allow inter-network communication. But allowing inter-network communication essentially rebuilds the complete MANET, and re-introduces the exponential growth that comes with network size, which is why inter-network communication is not envisioned in the embodiment of the invention.

Figure 7:
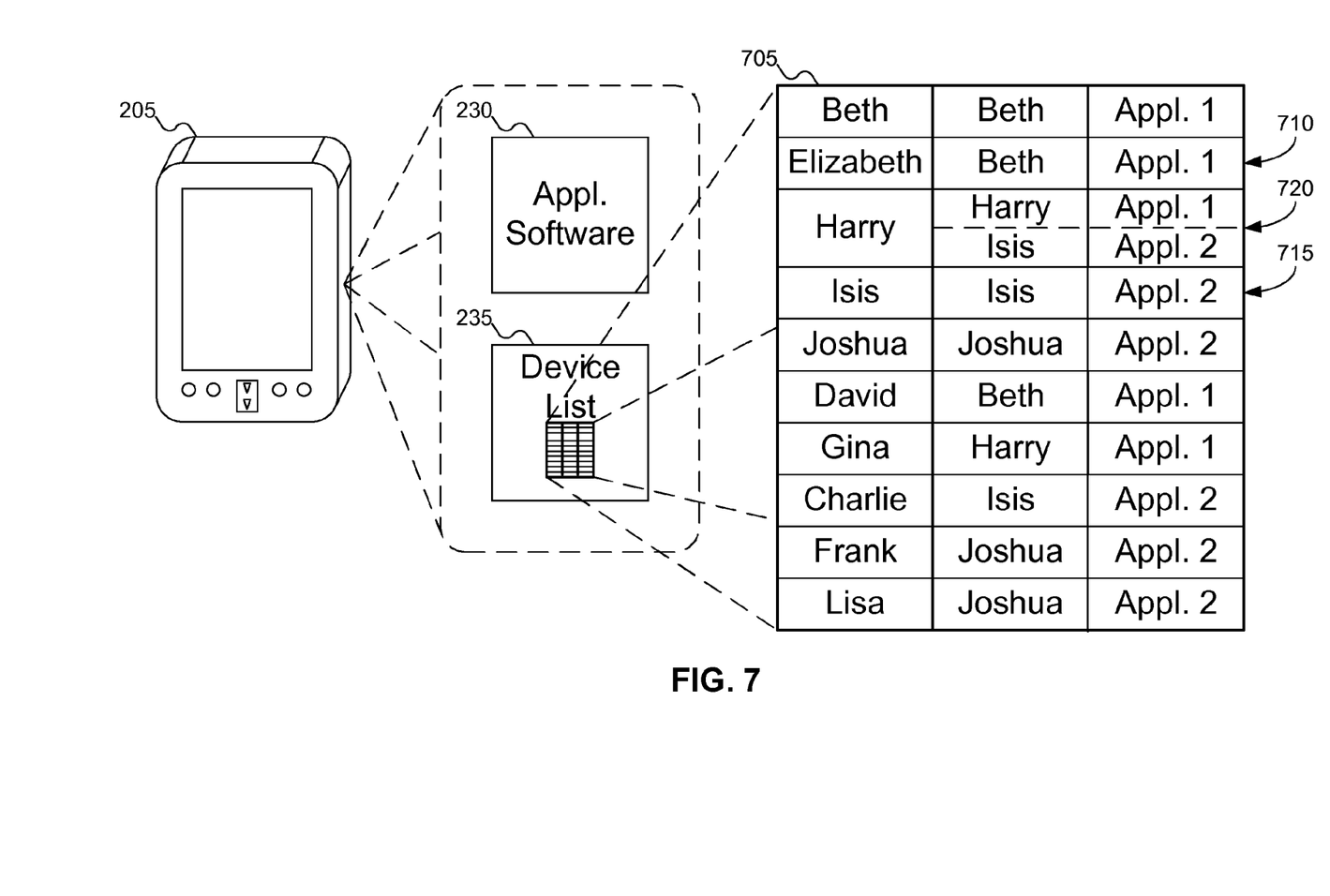
FIG. 7 shows the mobile device of FIG. 2 in the sub-networks of FIG. 6 including a routing table, according to an embodiment of the invention.

FIG. 7 shows the mobile device of FIG. 2 in the sub-networks of FIG. 6 including a routing table, according to an embodiment of the invention. Again, in FIG. 7, mobile device 205 belongs to Aaron. A person skilled in the art will recognize how FIG. 7 may be modified for other members of sub-networks 305 and 605, but will understand that Aaron's routing table 705 includes members of both sub-networks 305 and 605 only because Aaron 110 is a member of both sub-networks. The only other user who is a member of both sub-networks is Harry 155: all other users will only see the members within their individual sub-network.

In FIG. 7, as with FIG. 4, routing table 705 lists each possible recipient for a communication from mobile device 205, the device to which the communication should be sent (i.e., the first hop along the routing path from mobile device 205 to the communication's destination), and the properties of that device. For example, routing table entry 710 still specifies that to send a message to Elizabeth, the message should be sent to Beth first, since Beth and Elizabeth are members of only sub-network 305. Entry 715 specifies that to send a message to Isis, a member of sub-network 605, the message may be sent directly to Isis, since Aaron and Isis are directly connected.

Routing table entry 720 shows a new variation. Aaron may communicate with Harry as a member of either sub-network 305 or sub-network 605, since Aaron and Harry are members of both sub-networks. Accordingly, routing information between Aaron and Harry accounts for membership in both sub-networks. As shown in routing table entry 720, Aaron may communicate directly with Harry over sub-network 305. But messages from Aaron to Harry over sub-network 605 are sent to Isis first. Again, determining the least cost path between nodes in a MANET is beyond the scope of this discussion, but it might be that sub-network 305 is a gaming sub-network, and is therefore personal to Aaron, whereas sub-network 605 is a work sub-network, and should not be used for personal business. Then, factoring in costs for communicating between Aaron and Harry, the direct link between Aaron and Harry might be more expensive than the indirect link through Isis.

Figure 8:
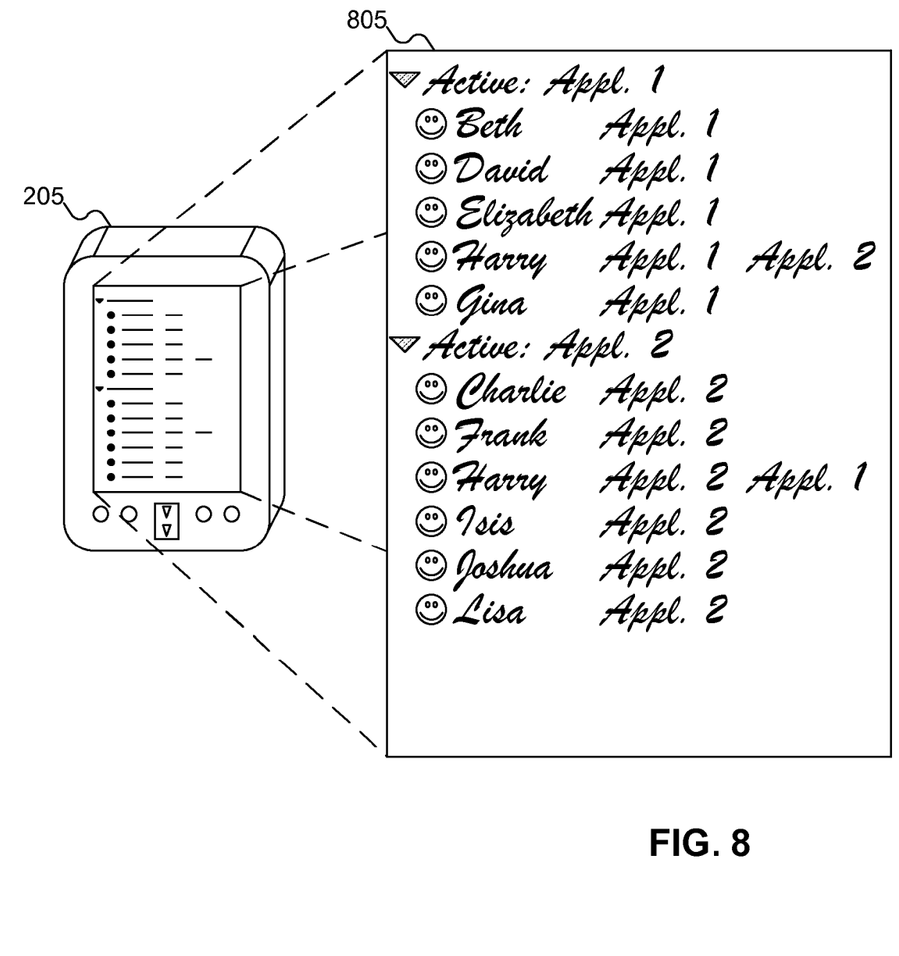
FIG. 8 shows a display of the mobile device of FIG. 2 in the sub-networks of FIG. 6, listing possible communication destinations, according to an embodiment of the invention.

FIG. 8 shows a display of the mobile device of FIG. 2 in the sub-networks of FIG. 6, listing possible communication destinations, according to an embodiment of the invention. In FIG. 8, the display of mobile device 205 is enlarged for easier viewing. Display 805 shows the list of recipients Aaron may communicate with, using either sub-network. Note that Harry is listed twice, as he is active in both sub-networks.

Figure 9A:
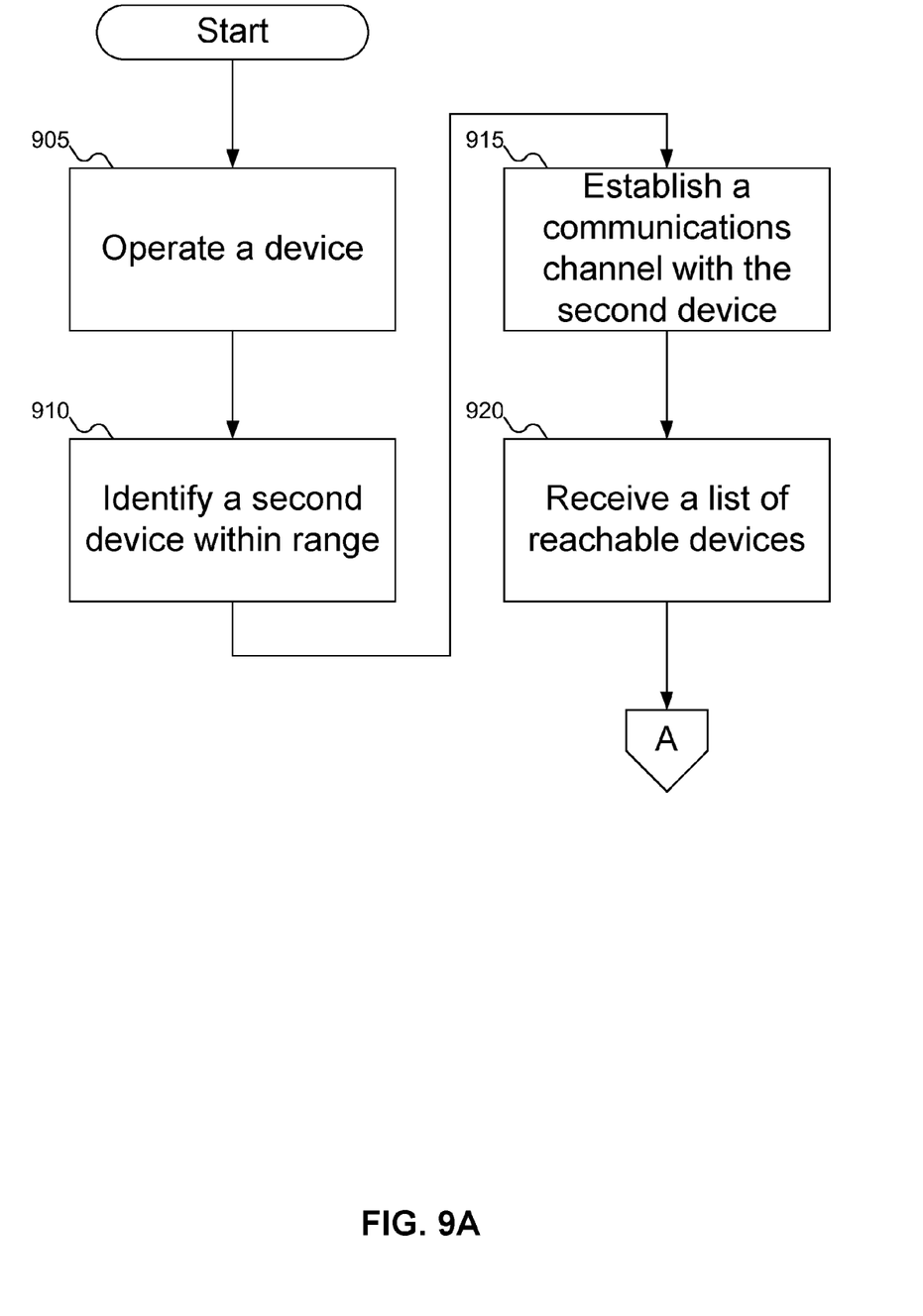
FIGS. 9A and 9B show the procedure used by the mobile device of FIG. 2 to construct the routing table of FIGS. 4 and 7, according to an embodiment of the invention.
Figure 9B:
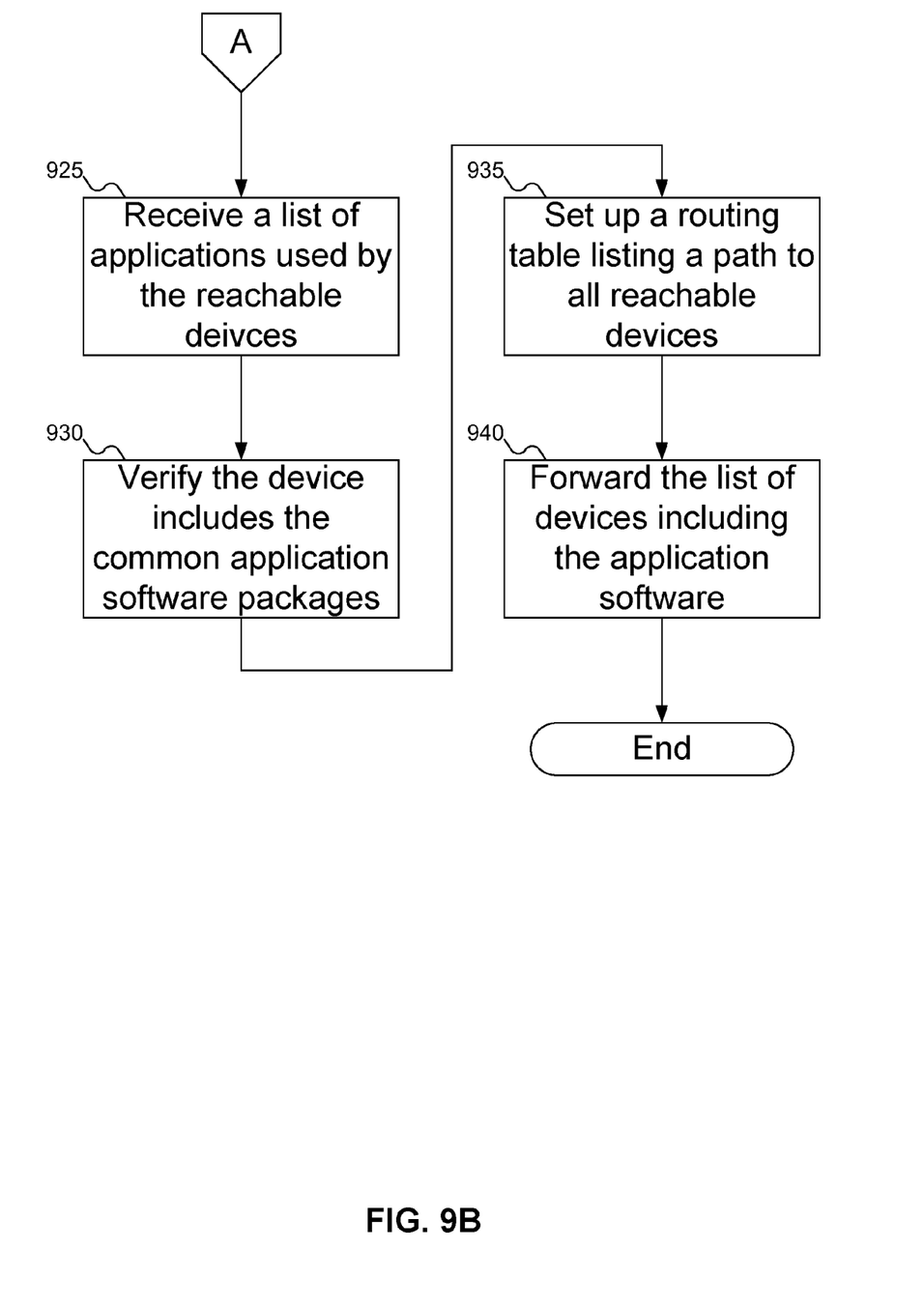

FIGS. 9A and 9B show the procedure used by the mobile device to construct the routing table of FIGS. 4 and 7, according to an embodiment of the invention. In FIG. 9A, at block 905, a user operates a device. As discussed above, the device is typically a mobile device, but the device may be stationary as well. At block 910, the device locates a second device within communications range. At block 915 the two devices establish communications between themselves. At block 920 the first device receives a list of devices the second device knows how to reach. For example, referring briefly to FIG. 1B, assume that Oscar 190 becomes active. When Oscar 190 finds out about Mark 185, Mark 185 sends to Oscar 190 a list of devices Mark 185 knows how to reach, so that Oscar 190 may construct his routing table.

Referring now to FIG. 9B, at block 925 the device receives information about the application software packages used by reachable devices. At block 930, the first device compares the list of reachable devices and their available application software packages with the application software installed within the device, to make sure the first device has the common application software. At block 935, the device sets up its internal routing table, specifying which reachable devices include application software packages in common with the device and how best to communicate with those reachable devices. Finally, at block 940, the device forwards information about reachable devices and their application software packages to other nearby devices.

The purpose of block 940 might not be obvious. If a device were new to the MANET, why would it need to forward information it just learned from other devices in the MANET? The reason is that the new device might make possible new, less expensive communications channels. In addition, it may happen that the device connects two otherwise-separated groups of users. In essence, the device might act as a bridge. By communicating information about reachable devices, the device may make possible changes in the sub-networks.

Figure 10:
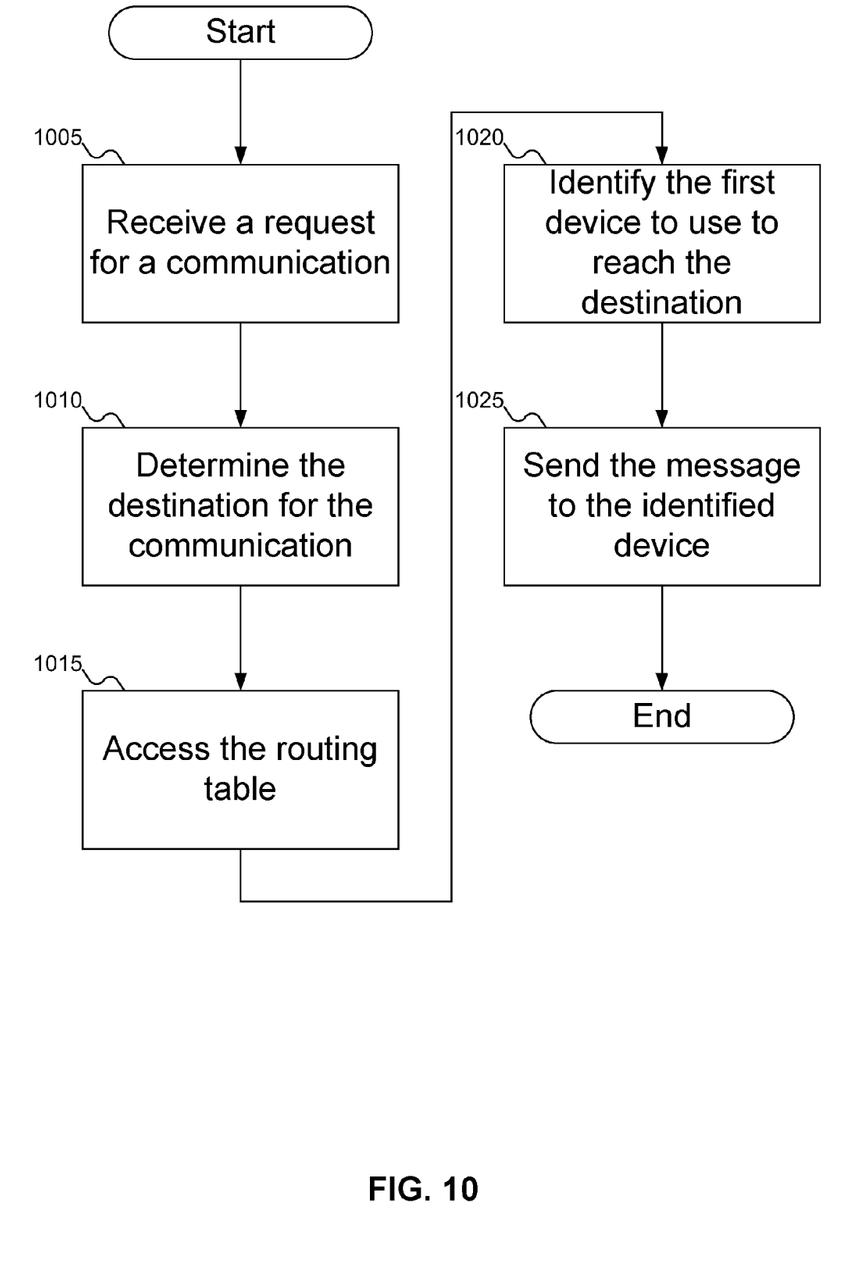
FIG. 10 shows the procedure used by the mobile device of FIG. 2 to route a message within the mobile ad-hoc network of FIGS. 3 and/or 6, according to an embodiment of the invention.

FIG. 10 shows the procedure used by the mobile device to route a message within the mobile ad-hoc network of FIGS. 3 and/or 6, according to an embodiment of the invention. In FIG. 10, at block 1005, a device receives a request for a communication. This request may come from a user, or from another device forwarding a message (possibly intended for yet another device). At block 1010, the device determines the intended recipient for the message. At block 1015, the device checks its routing table to identify to whom the message should be directed. Finally, at block 1020, the device delivers the message to the identified device.

Having illustrated and described the principles of my invention in an embodiment thereof, it should be readily apparent to those skilled in the art that the invention can be modified in arrangement and detail without departing from such principles. I claim all modifications coming within the spirit and scope of the accompanying claims.

What is claimed is:

1. A mobile device, comprising:
   a memory to store an installed application software package chosen by a user of the mobile device to be installed on the device and a device list including a dynamic routing table to one or more devices, wherein the application software package enables users of a mobile ad-hoc network having the same application software installed on devices of said users to share and operate the installed application software of each other via a subset of the ad-hoc network which includes only devices with the same installed application software package; and
   a processor to establish said subset of the ad-hoc network of the mobile devices of the ad-hoc network that include said installed application software package based on the routing table, wherein a route of the routing table is dynamically determined according to a cheapest cost of communication channels between mobile devices of said subset of said ad-hoc network which said cost of communication channels includes a direct or indirect route to an intended device of said subset of the ad-hoc network.

2. The mobile device according to claim 1, wherein the application software package comprises a game, the sub-network includes at least a sub-network of the game users, and the routing list includes one or more routes to the one or more other mobile devices including users of the application software package.

3. The mobile device according to claim 1, wherein the routing table is designed to store a route to at least one other reachable device including the application software package.

4. The mobile device according to claim 1, comprising:
a receiver to receive from a second mobile device another routing list of other devices having the application software reachable from said second mobile device.

5. A method comprising:
entering a mobile ad-hoc network and informing a device of the mobile ad-hoc network about an installed application software package;
dynamically updating a device list with devices having the same installed application software package; and
establishing a sub-network of only a subset of the mobile devices that have installed therein said application software package based on a routing table, wherein a route of the routing table is dynamically determined according to a cheapest cost of communication channels between mobile devices of said subset of said ad-hoc network which said cost of communication channels includes a direct or an indirect route to an intended device of said sub-network.

6. The method according to claim 5, further comprising:
installing the application software package, wherein the installing includes installing a game;
establishing the sub-network, wherein the establishing includes establishing a sub-network of said game users; and
establishing a communications channel between a first device of a first user of the game and second device of a second user of the game that have installed therein the application software package.

7. The method according to claim 5, further comprising:
receiving a list of devices of users of the game reachable from the second device, the list including a third device having the software application; and
establishing a communications channel from the first device through the second device to the third device.

8. The method according to claim 7, further comprising sending messages from the first device to the second device, to be relayed to the third device.

9. The method according to claim 8, wherein sending messages from the first device to the second device includes specifying a path from the first device to the third device.

10. The method according to claim 9, wherein receiving a list of devices reachable from the second device includes receiving an indication that the third device includes the application software.

* * * * *